(12) United States Patent
Zhang et al.

(10) Patent No.: US 8,770,225 B2
(45) Date of Patent: Jul. 8, 2014

(54) END COVER AND FOUR-WAY REVERSING VALVE USING THE SAME AND ASSEMBLING METHOD THEREOF

(75) Inventors: Guodong Zhang, Zhejiang Province (CN); Songyan Huang, Zhejiang Province (CN)

(73) Assignee: Zhejiang Sanhua Climate and Appliance Controls Group Co., Ltd, Chengguan Town (CN)

( * ) Notice: Subject to any disclaimer, the term of this patent is extended or adjusted under 35 U.S.C. 154(b) by 608 days.

(21) Appl. No.: 12/839,561

(22) Filed: Jul. 20, 2010

(65) Prior Publication Data

US 2011/0017319 A1    Jan. 27, 2011

(30) Foreign Application Priority Data

Jul. 24, 2009    (CN) .......................... 2009 1 0159639
Jul. 24, 2009    (CN) .......................... 2009 1 0159641

(51) Int. Cl.
   *F16K 11/074*    (2006.01)
(52) U.S. Cl.
   USPC ..................... 137/625.43; 251/62; 92/169.1
(58) Field of Classification Search
   USPC ............... 137/625.43; 92/169.1; 251/62–63.6
   See application file for complete search history.

(56) References Cited

U.S. PATENT DOCUMENTS

| | | | | |
|---|---|---|---|---|
| 2,983,286 A | * | 5/1961 | Greenawalt et al. ...... | 137/625.43 |
| 2,991,631 A | * | 7/1961 | Ray ............................... | 62/324.6 |
| 3,303,665 A | * | 2/1967 | Ray ............................... | 62/324.1 |

(Continued)

FOREIGN PATENT DOCUMENTS

| CN | 87203171 | 7/1988 |
|---|---|---|
| CN | 1035089 A | 8/1989 |

(Continued)

OTHER PUBLICATIONS

Raw Machine Translation for Foreign Reference CN101338827 "Zhejiang" provided by the EPO on Mar. 15, 2013. pp. 3-5.*

(Continued)

*Primary Examiner* — John Rivell
*Assistant Examiner* — David Colon Morales
(74) *Attorney, Agent, or Firm* — Wolf, Greenfield & Sacks, P.C.

(57) ABSTRACT

The present invention relates to a four-way reversing valve for refrigerating cycle system, in particular to an end cover for fitting with a valve body of a main valve of a four-way reversing valve, a four-way reversing valve using the same and an assembling method thereof. The end cover has a larger diameter section and a smaller diameter section sequentially provided in an axial direction, wherein an outer periphery of the larger diameter section of the end cover is adapted to be tightly connected with the valve body, and an end portion of the smaller diameter section of the end cover is adapted to be fitted with a piston of the main valve, so as to define an operating position of the piston, characterized in that the larger diameter section of the end cover has a frustum shape with a larger outer end and smaller inner end, or an end portion of the larger diameter section of the end cover has radially projected flange for abutting against and fitting with an end surface of the valve body. The present invention may meet the requirement for the position precision between the valve body and the end cover and improve the welding precision therebetween.

12 Claims, 5 Drawing Sheets

(56) References Cited

U.S. PATENT DOCUMENTS

| | | | |
|---|---|---|---|
| 3,357,453 A | | 12/1967 | Mongrone et al. |
| 3,400,736 A | | 9/1968 | Bastle et al. |
| 3,952,537 A | * | 4/1976 | Aoki et al. .................. 62/324.6 |
| 4,027,700 A | | 6/1977 | Perkins |
| 4,213,483 A | | 7/1980 | Bauer |
| 4,234,015 A | | 11/1980 | Kintner |
| 4,248,058 A | * | 2/1981 | Bauer et al. .................. 62/324.2 |
| 4,255,939 A | * | 3/1981 | Ou ............................. 62/324.2 |
| 4,290,453 A | * | 9/1981 | Bauer ...................... 137/625.43 |
| 4,340,202 A | * | 7/1982 | Hargraves et al. .............. 251/31 |
| 5,165,566 A | | 11/1992 | Linnér |
| 5,690,144 A | * | 11/1997 | Takahashi ................ 137/625.43 |
| 6,684,651 B1 | * | 2/2004 | Yoshizawa et al. ............. 62/160 |
| 2006/0037653 A1 | * | 2/2006 | Moreno ................... 137/625.43 |
| 2011/0000447 A1 | | 1/2011 | Hoppe et al. |

FOREIGN PATENT DOCUMENTS

| | | |
|---|---|---|
| CN | 1161420 A | 10/1997 |
| CN | 101338827 A | 1/2009 |
| JP | 62-293060 A | 12/1987 |
| JP | 04004568 | 4/1990 |
| JP | 04068972 | 7/1990 |
| JP | 2299769 A | 12/1990 |
| JP | 5-12843 U | 9/1993 |
| JP | 11201304 A | 7/1999 |
| JP | 200298126 A | 4/2002 |
| JP | 2000120892 A | 4/2005 |
| JP | 2005113990 A | 4/2005 |
| JP | 2005121131 A | 5/2005 |
| JP | 2007211814 A | 8/2007 |

OTHER PUBLICATIONS

Korean Office Action dated Nov. 15, 2012, from corresponding Korean Patent Application No. 10-2010-0066918, (6 pages) with English translation (6 pages).

Extended European Search Report dated Nov. 5, 2010 from corresponding European Application No. 10007524.

* cited by examiner

END COVER AND FOUR-WAY REVERSING VALVE USING THE SAME AND ASSEMBLING METHOD THEREOF

FIELD OF THE INVENTION

The present invention relates to a four-way reversing valve for refrigeration circulation system, in particular to an end cover, a four-way reversing valve using the same and an assembling method thereof.

BACKGROUND OF THE INVENTION

An existing four-way reversing valve is mainly comprised of an electromagnetic coil, a pilot valve and a main valve. During the control, the reversing of the main valve is achieved through the cooperation of the electromagnetic coil and the pilot valve to switch the circulating direction of the refrigerant, such that a heat pump air conditioner is switched between refrigeration state and heating state, thus realizing two functions with one machine, i.e., refrigerating in summer and heating in winter.

The main valve of the existing four-way reversing valve has three ports: a port S in communication with a suction port of a compressor, a port E in communication with an indoor heat exchanger and a port C in communication with an outdoor heat exchanger. Two end covers are respectively tightly connected with two side end portions of a cylindrical valve body to form a closed inner valve chamber of the main valve. The inner valve chamber of main valve is divided into three chambers, i.e., left, middle and right chambers by two pistons, in which the left chamber is communicated with a port e of a pilot valve and the right chamber is communicated with a port c of the pilot valve. In this way, under the control of the pilot valve, a slider inside the main valve is displaced along with the pistons, achieving the switch between two operating states of refrigeration state and heating state. In refrigerating position, the slider is slid to the left, the port E is communicated with the port S and the port D is communicated with the port C, and the left piston and an inward projecting portion of the left end cover abut against each other in this condition. In heating position, the slider is slid to the right, the port S is communicated with the port C and the port D is communicated with the port E, and the right piston and an inward projecting portion of the right end cover abut against each other in this condition.

It is known from the above described analysis of the operating principle, the requirement for precision in assembly and welding process between the two end covers and the valve body is relatively high. Reference is made to FIG. 1, which shows the position relationship between an end cover 1a and a valve body 2a of a prior art four-way reversing valve. After inserted into the inner chambers at two sides of the valve body 2a, the end valve 1a is fixedly connected thereto by argon welding. This fitting relationship ensures the fulfilling of the requirement for the position tolerance of the inward projected portion of the end cover by the cylindrical outer periphery surface of the end cover 1a and the inner wall of the valve body 2a abutting against each other.

Reference is also made to FIG. 2, which is an enlarged view of portion I in FIG. 1. However, the existing valve bodies are made of stainless steel sheet by drawing, and most finished valve bodies present cylindricity error; that is, there is phenomenon that one end of the valve body has a larger inner diameter and other end has a smaller inner diameter. Therefore, there is a problem that the fitting between the end cover and the valve body has a larger gap at one end while being tight at the other end. Then, in the practical assembly, the valve body is usually expanded after the end cover is pressed into the smaller diameter end of the valve body, so that a clearance fit is formed between the rear portion of the end cover and the valve body. As the fit clearance between the end cover and the larger diameter end of valve body is relatively large, the position precision and welding quality therebetween may be thus affected.

For this reason, optimization design is intended to be made for the existing end cover to ensure the assembly and welding precision between the end cover and the valve body through improvement of structural form.

SUMMARY OF THE INVENTION

With regard to the above shortcomings, the technical problem to be solved by this invention is to provide an end cover to overcome the problem that cylindricity error of the valve body affects assembly and welding precision between the end cover and the valve body through improving the structure so as to improve fitting relation between the end cover and the valve body. Based on that, the present invention also provides a four-way reversing valve using the end cover and an assembling method thereof.

The present invention provides an end cover for fitting with a valve body of a main valve of a four-way reversing valve, the end cover having a larger diameter section and a smaller diameter section sequentially provided in an axial direction, wherein an outer periphery of the larger diameter section of the end cover is adapted to be tightly connected with the valve body, and an end portion of the smaller diameter section of the end cover is adapted to be fitted with a piston of the main valve so as to define an operating position of the piston, characterized in that the larger diameter section of the end cover has a frustum shape with a larger outer end and smaller inner end.

Preferably, with the end cover as provided above, the frustum-shaped larger diameter section of the end cover particularly has a conical angle of 4° to 32°; preferably, with the end cover as provided above, the frustum-shaped larger diameter section of the end cover particularly has a generatrix length of 1 mm to 5 mm.

Moreover, this invention provides an end cover for fitting with a valve body of a main valve of a four-way reversing valve, the end cover having a larger diameter section and a smaller diameter section sequentially provided in an axial direction, wherein an outer periphery of the larger diameter section of the end cover is adapted to be tightly connected with the valve body, and an end portion of the smaller diameter section of the end cover is adapted to be fitted with a piston of the main valve so as to define an operating position of the piston, characterized in that an end portion of the larger diameter section of the end cover has a radially projected flange for abutting against and fitting with an end surface of the valve body.

Moreover, this invention provides an end cover for fitting with a valve body of a main valve of a four-way reversing valve, the end cover having a larger diameter section and a smaller diameter section sequentially provided in an axial direction, wherein an outer periphery of the larger diameter section of the end cover is adapted to be tightly connected with the valve body, and an end portion of the smaller diameter section of the end cover is adapted to be fitted with a piston of the main valve so as to define an operating position of the piston, characterized in that the larger diameter section of the end cover has a frustum shape with a larger outer end and smaller inner end, and an end portion of the larger diameter section of the end cover has a radially projected flange for abutting against and fitting with an end surface of the valve body.

Moreover, this invention provides a four-way reversing valve comprising a main valve and a pilot valve, the main valve comprising an end cover and a valve body, characterized in that the end cover and the valve body are made of stainless steel material, and the end cover is the end cover as described above.

Moreover, this invention provides an assembling method of a four-way reversing valve, comprising steps of fixedly connecting a pilot valve with a valve body of a main valve by welding, assembling components including a slider, a link and a piston, and fixedly connecting an end cover with the valve body by welding, etc., the end cover having a larger diameter section and a smaller diameter section sequentially provided in an axial direction, wherein an outer periphery of the larger diameter section of the end cover is tightly connected with the valve body, and an end portion of the smaller diameter section of the end cover is fitted with a piston of the main valve so as to define an operating position of the piston, characterized in that the end cover and an end portion of the valve body are connected by argon welding, laser welding or high energy-dense beam welding.

Further, with the assembling method as provided above, the larger diameter section of the end cover has a frustum shape with a larger outer end and smaller inner end, and an interference fit is formed between the outer end of the larger diameter section of the end cover and an inner wall of the valve body.

Further, with the assembling method as provided above, before the end cover and the valve body are connected by welding, the end covers are pressed into two ends of the valve body under pressurization.

Further, with the assembling method as provided above, an end portion of the larger diameter section of the end cover has a radially projected flange, and before the end cover and the valve body are connected by welding, the flange of the end cover is abutted against and fitted with an end surface of the valve body.

Preferably, with the assembling method as provided above, wherein the end cover and the valve body are made of stainless steel material.

Compared with the prior art, the larger diameter section of the end cover of the present invention has a frustum shape with a larger outer end and a smaller inner end. Due to the fact that the body of the larger diameter section of the end cover of this invention has a thin-walled structure, during the assembly, if subjected to a radially inward extrusion force, the larger diameter section of the end cover will make folding deformation inwardly around the smaller diameter end as a whole with its larger diameter end abuts against an inner wall of valve body. Thus, basing on a valve body to be assembled with a cylindricity error, as for the larger diameter end, the problem of excessive clearance therebetween may be effectively avoided as long as the dimension tolerance of the larger diameter end of the frustum-shaped valve cover is effectively controlled during the design; and as for the smaller diameter end, the resulting folding deformation may avoid the generation of large radial extrusion force during the pressing-in of the end cover, effectively solving the problem that the valve body is expanded by the excessive radial extrusion force, and thus avoiding an excessive clearance therebetween. After the assembly, the outer periphery surface of the larger diameter end or near the larger diameter end of the two end covers abuts against and fits with the inner wall of valve body, thus it is possible to meet the requirement for the position precision therebetween and to further improve the welding precision therebetween.

Also, another particular solution of the present invention in light of the technical idea to solve the same technical subject is that the larger diameter section of the end cover provided has a radially projected flange which is abutted against and fitted with the end surface of the valve body, and the welded portion between the end cover and the valve body is shifted to the outside of the end surface of the valve body. In this way, even there is a large radial clearance therebetween, the welding process could be performed without impact. The end cover provided by this invention is adapted for a structure relationship in which it is fitted with a cylinder, especially for a four-way reversing valve.

The four-way reversing valve provided by this invention includes a main valve and a pilot valve, in which the main valve includes a valve body and an end cover tightly connected with two side end portions of the valve body, and the end cover employs the end cover structure as described above.

With the assembling method of the four-way reversing valve provided by the present invention, the end cover and an end of the valve body are connected by argon welding, laser welding, or high energy-dense beam welding. Due to the employment of said end cover structure, the end cover may be produced by sheet stamping, so that the welding process is reliable and the product assembly is convenient.

The four-way reversing valve and assembling method thereof provided by the present invention may allow a higher precision-after-assembly, thus meeting the process requirements for the connection between the end cover of stainless steel material and the valve body by argon welding, laser welding or high energy-dense beam welding.

BRIEF DESCRIPTION OF THE DRAWINGS

In FIG. 3-7:

10—main valve, 20—pilot valve, 30—electromagnetic coil;

1/1'—end cover, 11/11'—larger diameter section of the end cover;

111'—flange;

12—smaller diameter section of the end cover, 121—end portion;

2/2'—valve body, 3—piston;

4—slider, 5—valve seat, 6—link

DETAILED DESCRIPTION OF THE INVENTION

Hereinafter, embodiments of the present invention will be described in detail with reference to the drawings.

Orientation words "upper", "lower", "left", "right", "outer", "inner" and the like involved in this context are defined with reference to the position of the four-way reversing valve shown in the accompanied drawings, and it should be understood the orientation words used are not intended to limit the protective scope of this invention.

Figure 1:
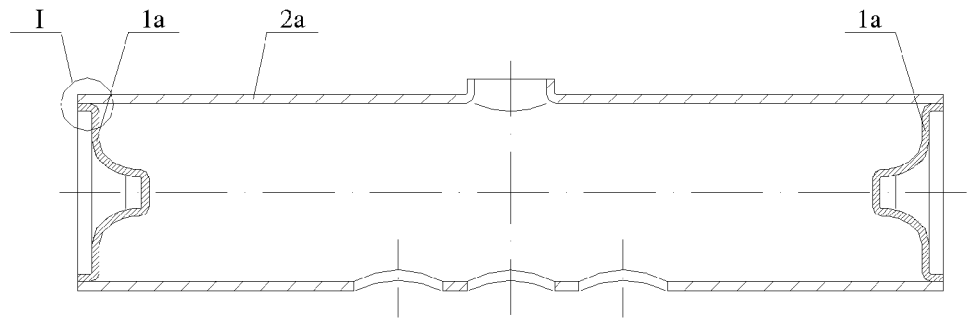
FIG. 1 shows the position relationship between the end cover and the valve body in the prior art.
Figure 2:
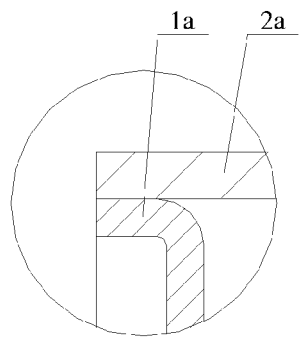
FIG. 2 is an enlarged view of portion I in FIG. 1.
Figure 3:
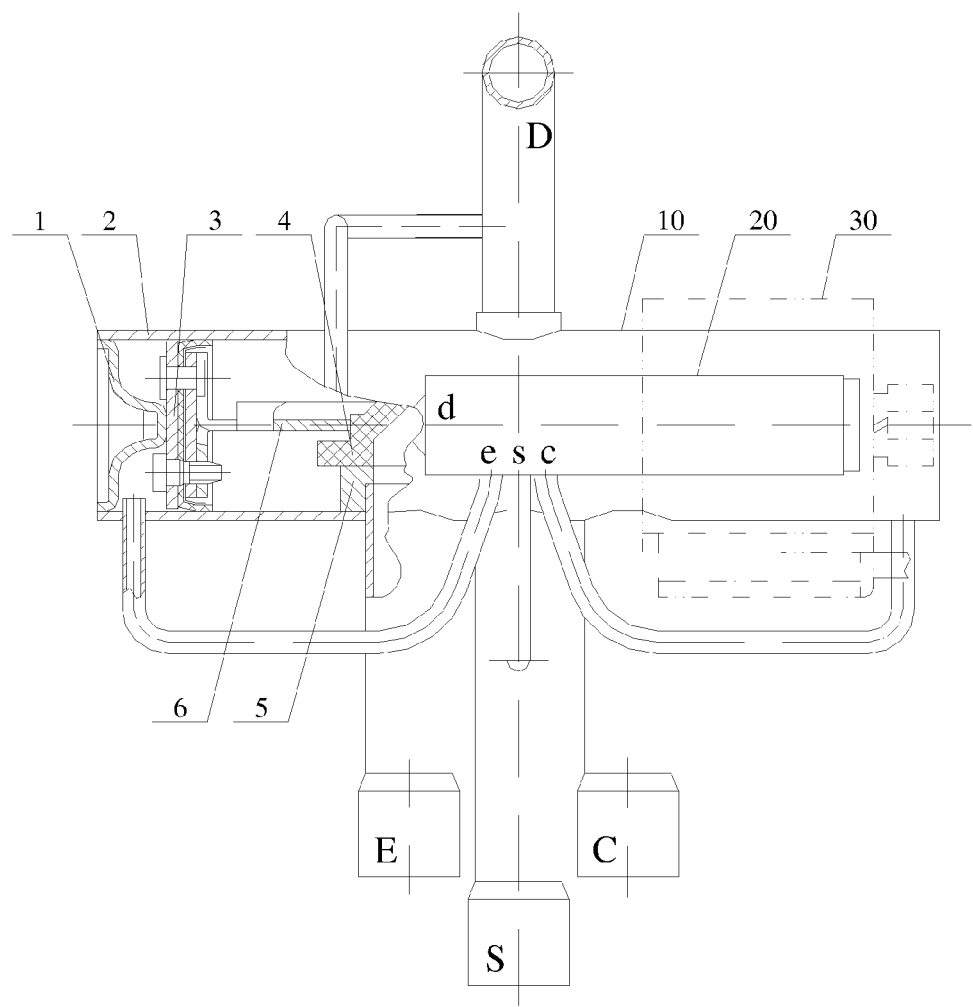
FIG. 3 is a schematic view of the overall structure of an four-way reversing valve.

FIG. 3 is a schematic view of the overall structure of a four-way reversing valve according to this embodiment.

As shown in FIG. 3, the four-way reversing valve is mainly comprised of a main valve 10, a pilot valve 20 and an electromagnetic coil 30.

The main valve 10 of the four-way reversing valve is mainly comprised of a valve body 2, end covers 1 tightly connected to two sides end portions of the valve body, a valve seat 5 fixedly provided at an inner chamber of valve body 2, two pistons 3 (on which only one is shown in the figure) positioned at two sides of valve seat 5 separately, a link 6 connecting the two pistons 3, and a slider 4 fixedly provided in the middle portion of the link 6. The main valve is divided into three chambers, i.e., left, middle and right chambers, by the two pistons 3. As the piston 3 moves left and right, the lower surface of the slider 4 may closely attached to and slide along the upper surface of the valve seat 5, the left and right limit position thereof are respectively refrigeration state and heating state. The refrigeration state is shown in FIG. 3. As shown, a connecting pipe D connected to a discharge port of a compressor is inserted and mounted to the valve body 1 at a side opposite to the valve seat 5. Three valve ports on the valve seat 5 are sequentially and respectively communicated with a connecting pipe E connected to an indoor heat exchanger, a connecting pipe S connected to an intake port of the compressor and a connecting pipe C connected to an outdoor heat exchanger.

The main functional components of the pilot valve 20 is completely the same as that in the prior art, for example, the valve seat is welded with a capillary e, a capillary s and a capillary c communicated with the left chamber of the main valve, the connecting pipe S and the right chamber of main valve respectively and sequentially, and a sleeve by the side of the valve seat is welded with a capillary d communicated with the connecting pipe D of the main valve.

The electromagnetic coil 30 is comprised of a coil component and a pilot valve body, and is fixed over the pilot valve 20 outwardly.

It should be noted that technical details of the pilot valve 20, the electromagnetic coil 30 and the like are not further explained here, due to the fact that they can be achieved by persons skilled in the art based on the prior art.

An improved solution as follows is provided herein based on the fitting relationship between the end cover and the valve body of the existing main valve. Detailed illustration will be made with reference to two typical embodiments.

Figure 4:
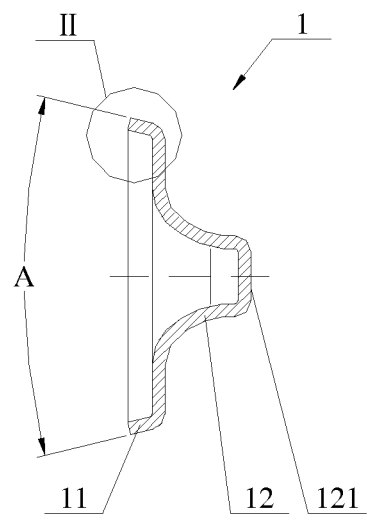
FIG. 4 is a schematic view of the overall structure of an end cover according to a first embodiment.

Reference is made to FIG. 4, which is a schematic view of the overall structure of a first kind of end cover.

As show in FIG. 4, it is same as an existing end cover in that the end cover 1 has a larger diameter section and a smaller diameter section sequentially provided in an axial direction, wherein, the larger diameter section of the end cover 11 has an outer periphery for tightly connected with the valve body, and the smaller diameter section of the end cover 12 has an end portion 121 for fitting with the piston of the main valve so as to define the operating position of the piston. The larger diameter section of the end cover 11 has a frustum shape with a larger outer end and a smaller inner end.

The radial dimension of the outer end of the larger diameter section of the end cover 11 is greater than the inner diameter section of the valve body 1, and the radial dimension of the inner end of the larger diameter section of the end cover 11 is smaller than the inner diameter of the valve body 2. During the assembly of the end cover 1 and the valve body 2, the larger diameter section of the end cover 11 will be subjected to a radially inward extrusion force. Moreover, due to the fact that the body of the larger diameter section of the end cover 11 has a thin-walled structure, it will make a folding deformation inwardly around the smaller diameter end as a whole under the effect of the radial extrusion force. Once the larger diameter section of the end cover 11 is completely positioned within the valve body, its larger diameter end abuts against an inner wall of the valve body to fulfill the requirements for the position precision between the end cover 1 and the valve body 2. To clearly illustrate the inventive idea of this application, reference is also made to FIG. 5, which is an enlarged view of portion II in FIG. 4.

It should be noted that the radial dimension of the larger diameter section of the end cover 11 should be determined according to the specification dimension of valve body. For example, it is required to determine the radial dimension D of the larger diameter end of the larger diameter section of the end cover 11, all that meet the demand of use are within the protective scope of this application.

Compared with the cylindrical larger diameter section of the existing end cover, the above described end cover provided by this embodiment is adapted to a valve body that the inner diameter dimensions of two ends thereof have a determined allowable error range. As for the larger diameter end, the problem of excessive clearance therebetween may be effectively avoided as long as the dimension tolerance of the larger diameter end of the frustum-shaped valve cover is effectively controlled during the design. As for the smaller diameter end, the resulting folding deformation may avoid the generation of large radial extrusion force during the pressing-in of the end cover, effectively solving the problem that the valve body is expanded by the excessive radial extrusion force, and thus avoiding an excessive clearance therebetween. After the assembly, the outer periphery surface of the larger diameter end or near the larger diameter end of the two end covers abuts against and fits with the inner wall of valve body, thus it is possible to meet the requirement for the position precision therebetween and to further improve the welding precision therebetween.

Through the improvement of the above described structure, new materials and technologies may be used for the four-way reversing valve product. In particular, stainless steel material, such as SUS304 material, may be used for the end cover and the valve body, which are connected by argon welding, laser welding or high energy-dense beam welding after the assembly.

To analyze from the viewpoint of the force being subjected, when the frustum-shaped larger diameter section of the end cover has a conical angle A that is too large, a large force is required to be applied for pressing the end cover into the valve body 2 accordingly. Thus the end cover 1 will be deformed due to its thin-walled structure if this force is large.

To avoid said deformation of the end cover 1, the frustum-shaped larger diameter section of the end cover has a conical angle A between 4° and 32°, preferably between 4° and 20°.

Figure 5:
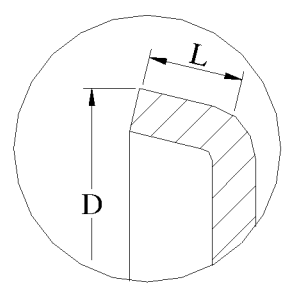
FIG. 5 is an enlarged view of portion II in FIG. 4.

In addition, as shown in FIG. 5, the frustum-shaped larger diameter section has a generatrix length L of specifically 1 mm to 5 mm to improve the stamping property and the guiding effect during the assembling, ensuring the verticality of the pressed end cover.

In addition, as shown in FIG. 5, to improve the weld processing property between the end cover 1 and the valve body 2, the thickness of the end surface of the end cover 1 is preferably corresponding to that of the valve body 2, and the thickness of the end surface of the end cover 1 should be controlled to be between 0.8 and 1.2 times of that of the valve body 2.

Figure 6:
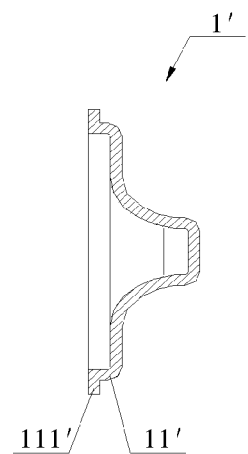
FIG. 6 is a schematic view of the overall structure of an end cover according to a second embodiment.

FIG. 6 is a schematic view of the overall structure of a second embodiment of the end cover.

As shown in FIG. 6, compared with the end cover according to the first embodiment, an end portion of an larger diameter section of the end cover 11' of an end cover 1' according to this embodiment is additionally provided with a radially projected flange 111' for abutting against and fitting with an end surface of an valve body 2'. Other constitution and connection relationship is the same as the first embodiment. Similarly, the end cover 1' according to this embodiment may be made from stainless steel sheet by stamping.

Figure 7:
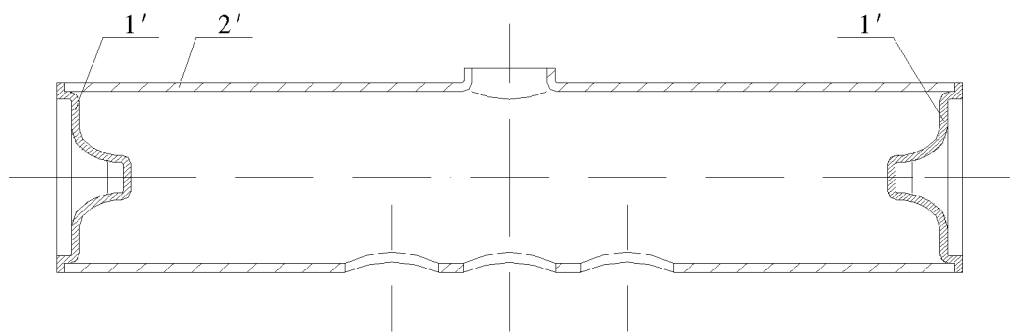
FIG. 7 is a schematic view of assembled end cover and valve body according to the second embodiment.
Figure 8:
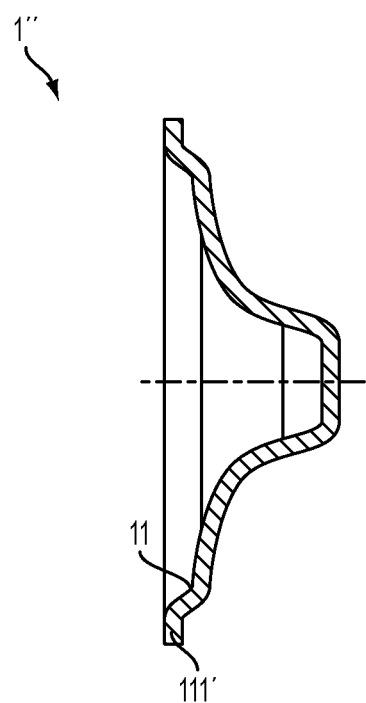
FIG. 8 is a schematic view of the overall structure of an end cover according to a third embodiment.

Thus, after the end cover 1' and the valve body 2' are assembled, the verticality requirement between the end cover 1' and the valve body 2' may be fulfilled. Reference is made to FIG. 7, which is a schematic view of assembled end cover and valve body according to the second embodiment. Through the improvement of the above described structure, new materials and technologies may be used for the four-way reversing valve product. In particular, stainless steel material, such as SUS304 material, may be used for the end cover and the valve body, which are connected by argon welding, laser welding or high energy-dense beam welding after assembly.

The four-way reversing valve provided by this invention includes the main valve and the pilot valve. The main valve includes the end cover and the valve body which are made of stainless steel material. The end cover has the above described end cover structure. The constituting method and effect of this four-way reversing valve have been described in detail in the foregoing description with reference to the end cover structure and will not be repeated hereinafter.

An assembling method of the four-way reversing valve provided by the present invention mainly includes the following steps:

Step 1: Forming of the End Cover and the Valve Body

Stainless steel sheet, such as SUS304, may be used for the end cover, which is then produced into finished pieces through deep drawing forming after blanking, having a shape of frustum as shown in FIG. 4 where the larger diameter section of the end cover has a larger outer end and a smaller inner end (hereinafter simply referred to as a first end cover structure); or having a radially projected flange at the end portion of the larger diameter section of the end cover as shown in FIG. 6 (hereinafter simply referred to as a second end cover structure). The valve body is made by stainless steel tubular material.

Step 2: Combination of the Valve Body Components

The valve body, the valve seat and the connecting pipes E, S, C and D are assembled, and then welded into a unit through furnace brazing or flame brazing, in which if flame brazing is used, a treatment process of removing the oxide scale by surface treatment is still needed after welding.

Step 3: Combination of the Pilot Valve and the Valve Body

The pilot valve and valve body components are assembled and fixedly connected by welding.

Step 4: Assembly

The slider, the link, the piston and the like are assembled.

Step 5: Fitting of the End Cover

If the first end cover structure is the case, an interference fit is formed between the outer end of the larger diameter section of the end cover and the inner wall of the valve body. Particularly depending on material and dimension, interference value is preferably controlled, for example, to be between 0.1 mm and 0.6 mm. The end covers are pressed into two ends of the valve body by manual, hydraulic, pneumatic or the like type of press machine, so that the outer end of the end cover is flush with or slightly misaligned from the outer end of the valve body, then the work piece is placed onto a clamp to be clamped and secured. If the second end cover structure is the case, interference or transition forms may be selected according to the matching dimension between these two pieces, the flange of the end cover is abutted against and fitted with the end surface of the valve body, then the work piece is placed onto a clamp to be clamped and secured.

Step 6: Fixedly Connection of the End Cover and the Valve Body by Welding

Both of them are welded into a unit using argon welding, plasma welding, laser welding or the like. During welding, the internal components of the valve body is positioned at the center portion thereof, and the welded portion is immediately cooled with wet towels, cool air or the like after welding to alleviate heat affect applied on the piston by welding.

An operating process of the four-way reversing valve provided by the present invention is as follows:

When the air conditioner needs to be operated in refrigeration state, the electromagnetic coil 30 is de-energized, and two capillaries e and s and two capillaries c and d of the pilot valve 20 are communicated with each other separately. At this time, the left chamber of the main valve is a low pressure, low temperature area, and the right chamber thereof is a high pressure, high temperature area. Thus, a pressure difference is established between the left and right chambers within the main valve 10. Under the effect of this pressure difference, the slider 4 and the piston 3 move to the left, thus two pipes E and S are communicated with each other, and two pipes D and C are communicated with each other. At this time, the circulating path of the refrigerant within the system is: the compressor discharge port→the connecting pipe D→the main valve body→the connecting pipe C→the outdoor heat exchanger→expansion element→the indoor heat exchanger→the connecting pipe E→the slider 4→the connecting pipe S→the compressor suction port, thus the system performs a refrigerating cycle.

When the air conditioner needs to be operated in heating state, the electromagnetic coil 30 is energized, and two capillaries c and s and two capillaries e and d of the pilot valve 20 are communicated with each other, separately. At this time, the right chamber of the main valve is a low pressure, low temperature area, and the left chamber thereof is a high pressure, high temperature area. Thus, a pressure difference is established between the left and right chambers within the main valve 10. Under the effect of this pressure difference, the slider 4 and the piston 3 move to the right, thus two pipes C and S are communicated with each other, and two pipes D and E are communicated with each other. At this time, the circulating path of the refrigerant within the system is: the compressor discharge port→the connecting pipe D→the main valve body→the connecting pipe E→the indoor heat exchanger→expansion element→the outdoor heat exchanger→the connecting pipe C→the slider 4→the connecting pipe S→the compressor suction port, thus the system performs a heating cycle.

The above description only refers to preferable embodiments of this invention, and it should be appreciated that a plurality of development and modification may be made without deflecting from the principle of this invention, which are all intended to fall within the protective scope of this invention.

What is claimed is:

1. An end cover for fitting with a valve body of a main valve of a four-way reversing valve, the end cover comprising a larger diameter section and a smaller diameter section sequentially provided in an axial direction, wherein an outer periphery of the larger diameter section of the end cover is adapted to be tightly connected with an end portion of the valve body, and an end portion of the smaller diameter section of the end cover is adapted to be fitted with a piston of the main valve so as to define an operating position of the piston, and the larger diameter section of the end cover has a frustum shape with a larger outer end and smaller inner end, wherein the larger outer end of the larger diameter section of the end cover has a radial dimension greater than an inner diameter of the end portion of the valve body, and the smaller inner end of the larger diameter section of the end cover has a radial dimension smaller than the inner diameter of the end portion of the valve body; and the larger diameter section of the end cover is configured to be subjected to a radially inward extrusion force during assembly of the end cover onto the valve body and to be foldingly deformed inwardly as a whole around the smaller diameter end of the end cover under the action of the radially inward extrusion force, so as to abut against an inner wall of the valve body.

2. The end cover according to claim 1, wherein the frustum-shaped larger diameter section of the end cover particularly has a conical angle of 4° to 32°.

3. The end cover according to claim 2, wherein the frustum-shaped larger diameter section of the end cover particularly has a generatrix length of 1 mm to 5 mm.

4. The end cover according to claim 1, wherein an end portion of the larger diameter section of the end cover has a radially projected flange for abutting against and fitting with an end surface of the valve body.

5. A four-way reversing valve comprising a main valve and a pilot valve, the main valve comprising an end cover and a valve body, characterized in that the end cover and the valve body are made of stainless steel material, and the end cover is the end cover according to claim 1.

6. The four-way reversing valve according to claim 5, wherein the frustum-shaped larger diameter section of the end cover particularly has a conical angle of 4° to 32°.

7. The four-way reversing valve according to claim 6, wherein the frustum-shaped larger diameter section of the end cover particularly has a generatrix length of 1 mm to 5 mm.

8. The four-way reversing valve according to claim 5, wherein an end portion of the larger diameter section of the end cover has a radially projected flange for abutting against and fitting with an end surface of the valve body.

9. An assembling method of a four-way reversing valve, comprising steps of fixedly connecting a pilot valve with a valve body of a main valve by welding, assembling components including a slider, a link and a piston, and fixedly connecting an end cover with the valve body by welding, the end cover having a larger diameter section and a smaller diameter section sequentially provided in an axial direction, wherein an outer periphery of the larger diameter section of the end cover is tightly connected with the valve body, and an end portion of the smaller diameter section of the end cover is fitted with a piston of the main valve so as to define an operating position of the piston, characterized in that the end cover and an end portion of the valve body are connected by argon welding, laser welding or high energy-dense beam welding, wherein the larger diameter section of the end cover has a frustum shape with a larger outer end and smaller inner end, and an interference fit is formed between the outer end of the larger diameter section of the end cover and an inner wall of the valve body; and wherein the larger outer end of the larger diameter section of the end cover has a radial dimension greater than an inner diameter of the end portion of the valve body, and the smaller inner end of the larger diameter section of the end cover has a radial dimension smaller than the inner diameter of the end portion of the valve body; and the larger diameter section of the end cover is configured to be subjected to a radially inward extrusion force during assembly of the end cover onto the valve body and to be foldingly deformed inwardly as a whole around the smaller diameter end of the end cover under the action of the radially inward extrusion force, so as to abut against the inner wall of the valve body.

10. The assembling method of the four-way reversing valve according to claim 9, wherein before the end cover and the valve body are connected by welding, the end covers are pressed into two ends of the valve body under pressurization.

11. The assembling method of the four-way reversing valve according to claim 9, wherein an end portion of the larger diameter section of the end cover has a radially projected flange, and before the end cover and the valve body are connected by welding, the flange of the end cover is abutted against and fitted with an end surface of the valve body.

12. The assembling method of a four-way reversing valve according to claim 9, wherein the end cover and the valve body are made of stainless steel material.

* * * * *